United States Patent [19]

Hamamura et al.

[11] Patent Number: 5,805,939
[45] Date of Patent: *Sep. 8, 1998

[54] CAMERA ARRANGED WITH A VIEWFINDER SYSTEM HAVING AN OPTICAL AXIS DIFFERENT FROM THAT OF A DISTANCE MEASURING DEVICE

[75] Inventors: Toshihiro Hamamura, Osaka; Akira Shiraishi, Sakai; Takeshi Yamawaki, Osaka; Hiroyuki Okada, Sakai, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 464,941

[22] Filed: Jun. 5, 1995

[30] Foreign Application Priority Data

Jun. 7, 1994 [JP] Japan .................................. 6-125155
Jun. 7, 1994 [JP] Japan .................................. 6-125156

[51] Int. Cl.$^6$ .................................................. G03B 13/36
[52] U.S. Cl. ........................... 396/123; 396/121; 396/80; 396/82; 396/378
[58] Field of Search .................................. 354/402, 408; 396/80, 82, 121, 123, 124, 378, 379

[56] References Cited

U.S. PATENT DOCUMENTS

| | | | |
|---|---|---|---|
| 4,126,871 | 11/1978 | Tamura et al. | 354/25 |
| 4,391,513 | 7/1983 | Fujiki | 354/25 |
| 4,402,586 | 9/1983 | Ichiyanagi | 354/25 |
| 4,405,220 | 9/1983 | Kusaka et al. | 354/25 |
| 4,855,777 | 8/1989 | Suda et al. | 354/402 |
| 4,859,842 | 8/1989 | Suda et al. | 354/408 |
| 4,941,009 | 7/1990 | Yoshida | 354/402 |
| 5,051,767 | 9/1991 | Homma et al. | 396/80 |
| 5,083,149 | 1/1992 | Kudo et al. | 354/402 |
| 5,155,347 | 10/1992 | Nishibe | 354/408 |
| 5,262,819 | 11/1993 | Ohtaka et al. | 354/402 |
| 5,285,234 | 2/1994 | Hasegawa et al. | 354/408 |
| 5,311,241 | 5/1994 | Akashi et al. | 354/402 |

*Primary Examiner*—Safet Metjahic
*Assistant Examiner*—Michael Dalakis
*Attorney, Agent, or Firm*—Burns, Doane, Swecker & Mathis, LLP

[57] ABSTRACT

A camera has a variable focal length lens and a viewfinder system whose magnification is variable in accordance with the focal length of the lens. A line array sensor generates an electrical signal in accordance with the intensity of the received light. A distance measuring optical system, which transmits light from a photographic object to the sensing elements of the sensor, has an optical axis which is different from the optical axis to the viewfinder system. A designator designates a particular sensing area, corresponding to the focal length of the lens, over the sensing elements of the sensor. A first distance data generator generates first distance data based on electrical signals generated by the sensing elements within the designated sensing area, and a second distance data generator generates second distance data based on electrical signals generated by the sensing elements outside of the designated sensing area. A discriminator discriminates whether the first distance data generator is operable. A selector selects the first distance data generator when it has been discriminated to be operable, and the second distance data generator when the first distance data generator is discriminated to be inoperable. A focusing device places the lens in an in-focus state based on the selected first or second distance data.

12 Claims, 11 Drawing Sheets

CAMERA ARRANGED WITH A VIEWFINDER SYSTEM HAVING AN OPTICAL AXIS DIFFERENT FROM THAT OF A DISTANCE MEASURING DEVICE

BACKGROUND OF THE INVENTION

This invention relates to a camera arranged with a distance measuring device, particularly to a camera which includes a taking lens whose focal length is variable and a viewfinder system whose optical magnification changes according to the focal length of the taking lens, an optical axis of the viewfinder system and that of the distance measuring device being different.

There have been known cameras provided with a distance measuring device adopting a passive trigonometric distance measuring method which uses external light. In such distance measuring devices, usually, an object image is picked up through its own optical system, and sensed by a pair of line sensors. Thereafter, distance data is obtained by performing a correlation calculation to pixel data obtained by the respective line sensors. In general, the optical system of the distance measuring device has an optical axis different from those of the taking lens and the viewfinder system.

On a screen of the viewfinder system, a distance measurement frame, e.g., in the form of brackets, is provided to facilitate the visualization of viewfinder optical system. The magnification of the viewfinder system varies with the focal length of the taking lens system, whereas the magnification of the optical system of the distance measuring device is fixed. Accordingly, despite the unchanged distance measurement area where the distance measuring device actually performs distance measurement, the size of the object image displayed in the fixed distance measurement frame varies because the magnification of the viewfinder system varies with the focal length.

Specifically, the distance measurement frame is designed to correspond with a particular distance measurement area of the distance measuring device at a specified focal length of the taking lens. However, the distance measurement area becomes larger relative to the distance measurement frame at focal lengths longer than the above specified focal length. In other words, the camera operator will see through the viewfinder window that a part of an actual distance measurement area falls within the distance measurement frame. Conversely, the distance measurement area becomes smaller relative to the distance measurement frame at focal lengths shorter than the above specified focal length. In other words, the camera operator will see through the viewfinder window that object images around the distance measurement area also fall within the distance measurement frame. As a result, the distance measurement is performed for the object(s) the camera operator does not intend.

In view thereof, U.S. Pat. No. 5,051,767 proposes a camera which performs distance measurement on the basis of a distance measurement frame regardless of focal lengths, i.e., magnification of a viewfinder system. Specifically, distance calculation is carried out using pixel data corresponding to the distance measurement frame within an actual distance measurement area so that an accurate distance data can be obtained.

In this U.S. patent, however, there is a high possibility that a targeted object image is judged to be low contrast because the distance measurement is impossible or the distance data obtained through a correlation calculation is unreliable due to a narrow view relative to the distance measurement frame, particularly, at the telephoto side. In such a case, since the taking lens cannot attain an in-focus condition. To eliminate this drawback, there is disclosed a so-called focus lock manner of forcibly maintaining the focal length at a specified value, e.g., 5 m. In the focus lock manner, the distance measurement is preliminarily performed for another object which is thought to be substantially the same distant from the camera as a targeted object, and that photographing is conducted by directing the camera to the targeted object while keeping the distance measurement state. However, it is very difficult and cumbersome to use the focus lock function for camera operators who do not understand it. Also, the possibility is not high of attaining the in-focus condition according to the focus lock manner of setting the focal length at the specified value.

SUMMARY OF THE INVENTION

It is an object of the present invention to provide a camera which has overcome the above-mentioned problems residing in the prior art.

It is an object of the present invention to provide a camera arranged with a distance measuring device which can reliably measure an increased range of distance to an object as well as assuring an enhanced viewfinder function.

The present invention is directed to a camera comprising: a taking lens for photographing an object, the focal length of the taking lens being variable; a viewfinder system whose magnification is changeable in accordance with a varied focal length of the taking lens, the viewfinder system having an optical axis; a sensor having a number of sensing elements which are arrayed in a line and each receive light to generate an electrical signal in accordance with an intensity of the received light, the sensing elements being defined with a plurality of particular sensing areas corresponding to a plurality of varied focal lengths of the taking lens; a distance measuring optical system which introduces light from the object to the sensing elements of the sensor, and having an optical axis different from the optical axis of the viewfinder system; a first distance data generator which is operable to generate distance data based on electrical signals generated in the sensing elements within a particular sensing area corresponding to a varied focal length; a second distance data generator which is operable to generate distance data based on electrical signals generated in the sensing elements within a sensing area other than the particular sensing area; a discriminator which discriminates whether or not the first distance data generator is operable; and a controller which allows the first distance data generator to generate distance data while suspending the second distance data generator when the first distance data generator is discriminated to be operable, and allows the second distance data generator to generate distance data when the first distance data generator is discriminated to be inoperable.

It may be appreciated to provide the camera with a focusing device which places the taking lens an in-focus state based on the generated distance data.

The particular sensing area may made to correspond to a distance measurement frame provided on a viewfinder of the viewfinder system.

Also, the present invention is directed to a camera comprising: a taking lens for photographing an object, the taking lens being selectively settable either in a first photographing mode of photographing an object which is away from the camera in a first distance or in a second photographing mode of photographing an object which is away from the camera in a second distance smaller than the first distance: a viewfinder system having an optical axis; a sensor having a number of sensing elements which are arrayed in a line and each receive light to generate an electrical signal in accordance with an intensity of the received light, the sensing elements being defined with particular sensing areas corresponding to the first and second photographing modes of the taking lens, respectively; a distance measuring optical system which introduces light from the object to the sensing elements of the sensor, and having an optical axis different from the optical axis of the viewfinder system; a first distance data generator which is operable to generate a first distance data based on electrical signals generated in the sensing elements within a particular sensing area corresponding to a selected photographing mode; a second distance data generator which is operable to generate a second distance data based on electrical signals generated in the sensing elements within a sensing area other than the particular sensing area; a discriminator which discriminates whether or not the first distance data generator is operable; and a controller which allows the first distance data generator to generate distance data while suspending the second distance data generator when the first distance data generator is discriminated to be operable, and allows the second distance data generator to generate distance data when the first distance data generator is discriminated to be inoperable.

Further, the present invention is directed to a camera comprising: a taking lens for photographing an object; a viewfinder system including a viewfinder screen provided with a distance measurement frame; a sensor having a number of sensing elements which are arrayed in a line and each receive light to generate an electrical signal in accordance with an intensity of the received light, the sensing elements being defined with a particular sensing area corresponding to the distance measurement frame provided on the viewfinder screen; a distance measuring optical system which introduces light from the object to the sensing elements of the sensor, and having an optical axis different from the optical axis of the viewfinder system; a first distance calculator which is operable to calculate a first distance based on electrical signals generated in the sensing elements within the particular sensing area; a second distance calculator which is operable to calculate a second distance based on electrical signals generated in the sensing elements within a sensing area other than the particular sensing area; a discriminator which discriminates whether or not the first distance calculator is operable; and a controller which allows the first distance calculator to calculate a distance while suspending the second distance calculator when the first distance calculator is discriminated to be operable, and allows the second distance calculator to calculate a distance when the first distance calculator is discriminated to be inoperable.

Further, the present invention is directed to a camera comprising: a taking lens for photographing an object, the focal length of the taking lens being variable; a viewfinder system whose magnification is changeable in accordance with a varied focal length of the taking lens, the viewfinder system having an optical axis and a viewfinder screen provided with a distance measurement frame; a sensor having a number of sensing elements which are arrayed in a line and each receive light to generate an electrical signal in accordance with an intensity of the received light; a distance measuring optical system which introduces light from the object to the sensing elements of the sensor, and having an optical axis different from the optical axis of the viewfinder system; a designator which designates a particular sensing area corresponding to a varied focal length of the taking lens over the sensing elements of the sensor; a first distance data generator which is operable to generate a first distance data based on electrical signals generated in the sensing elements within the particular sensing area designated by the designator; a second distance data generator which is operable to generate a second distance data based on electrical signals generated in the sensing elements within a sensing area other than the particular sensing area; a discriminator which discriminates whether or not the first distance data generator is operable; a selector which selects the first distance data generator when the first distance data generator is discriminated to be operable, and the second distance data generator when the first distance data generator is discriminated to be inoperable; and a focusing device which places the taking lens an in-focus state based on the generated distance data.

Moreover, the present invention is directed to a camera comprising: a taking lens for photographing an object, the focal length of the taking lens being variable; a viewfinder system whose magnification is changeable in accordance with a varied focal length of the taking lens, the viewfinder system having an optical axis; a sensor having a number of sensing elements which are arrayed in a line and each receive light to generate an electrical signal in accordance with an intensity of the received light, the sensing elements being defined with a plurality of particular sensing areas corresponding to a plurality of varied focal lengths of the taking lens; a distance measuring optical system which introduces light from the object to the sensing elements of the sensor, and having an optical axis different from the optical axis of the viewfinder system; a first distance data generator which is operable to generate distance data based on electrical signals generated in the sensing elements within a particular sensing area corresponding to a varied focal length; a second distance data generator which is operable to generate distance data based on electrical signals generated in the sensing elements within a sensing area other than the particular sensing area; a discriminator which discriminates whether or not the first distance data generator is operable; and a controller which selects the distance data generated by the first distance data generator when the first distance data generator is discriminated to be operable, and selects the distance data generated by the second distance data generator when the first distance data generator is discriminated to be inoperable.

A focusing device may be further provided which places the taking lens in an in-focus state based on the selected distance data.

In these cameras, there are the first distance data generator operable to generate distance data based on electrical signals in the sensing elements within a particular sensing area corresponding to a varied focal length and the second distance data generator operable to generate distance data based on electrical signals in the sensing elements within a sensing area other than the particular sensing area. Distance data of the first distance data generator is first used. However, if the first distance data generator is inoperable, distance data of the second distance data generator is used. Accordingly, even with the camera in which the optical axis of the distance measurement is different from that of the viewfinder system, distance measurement can be effected more accurately in a greater distance range.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1:
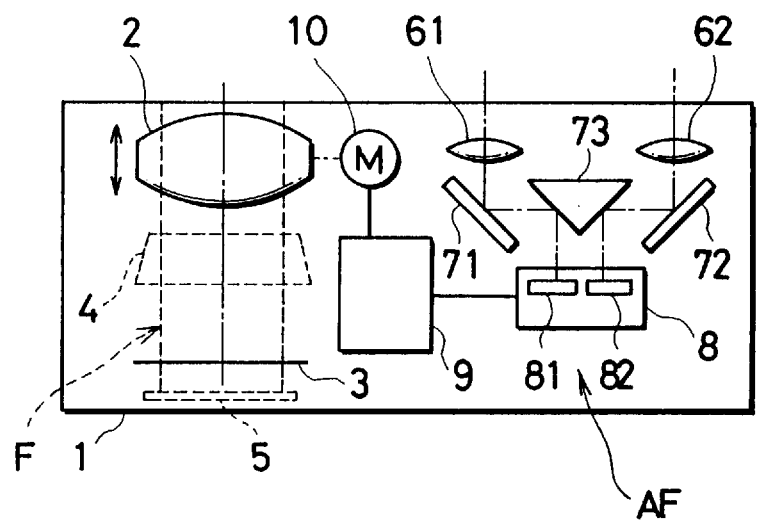
FIG. 1 is a plan view showing optical systems of a camera arranged with a distance measuring device according to the invention.

FIG. 1 is a plan view showing optical systems of a camera incorporating a distance measuring device according to the invention. A taking lens 2 of a taking lens system for photographing an object is provided on the front face (upper side in FIG. 1) of a camera main body 1. The taking lens 2 is a zooming lens having a focal length changeable continuously or discretely. A film 3 is disposed at the rear side of an optical axis of the taking lens 2 by way of unillustrated diaphragm and shutter.

A viewfinder system F is disposed between the taking lens 2 and the film 3, and is constructed as follows. When a distance is measured, the optical axis is separated by means of a mirror 4 of semitransparent type or entire reflection type inclined at 45° C. An object image is introduced to a focusing position at the rear face of the camera main body 1 via an orientation changer such as a prism disposed at an intermediate position of the optical axis and is formed via a viewfinder display 5 made of a semitransparent plate to enable the camera operator to observe it.

A distance measuring frame 50 in the form of brackets of a predetermined size is written in a specified position of the semitransparent plate constituting the viewfinder display 5, e.g., in a center position thereof. This distance measuring frame 50 is adapted to show a distance measuring area relative to the object image displayed on the viewfinder display 5.

Since the viewfinder system F is disposed behind the taking lens 2, its magnification varies with the focal length of the taking lens 2. In the case that the mirror 4 is of entire reflection type, a known construction is adopted in which the mirror 4 is retracted from its position on the optical axis during the photographing operation.

The viewfinder system F may be constructed such that it has an optical axis in a position different from that of the taking lens system, i.e., different from the optical axis of the taking lens 2, and the magnification thereof is made variable with the focal length of the taking lens 2 via a gearing device or an electrical device such as a servo motor. This construction is also capable of realizing the same viewfinder function as above.

An automatic focusing system AF is disposed laterally of the taking lens 2 in the camera, and includes a distance measuring device. A focusing lens provided in the taking lens 2 is moved in accordance with a result of the distance measuring device to place the taking lens in an in-focus state. The distance measuring device includes a pair of objective lenses 61 and 62, mirrors 71, 72 and 73, and a sensor 8 comprising a pair of line sensors 81 and 82. The automatic focusing system AF has an optical axis at least different from that of the viewfinder system F.

The pair of objective lenses 61 and 62 are disposed on the front face of the camera main body 1 with spaced apart by a specified distance, and are faced forward. Beams of light from the object transmitted through the objective lenses 61 and 62 are introduced to the corresponding line sensors 81 and 82 by way of the mirrors 71, 72 and the mirror 73.

The line sensors 81 and 82 are spaced apart in parallel by a predetermined distance, and each includes a multitude of photoelectric conversion elements such as CCDs arranged in a line. The line sensors 81 and 82 sense the object image having passed through the objective lens 61 and 62, respectively. The received object image is converted into digital pixel data which is in turn introduced to a controller 9 for performing a distance calculation. Indicated at 10 is a focusing motor as a driving device for driving the taking lens 2 to attain an in-focus condition based on distance data obtained as the result of the calculation by the controller 9.

Figure 2:
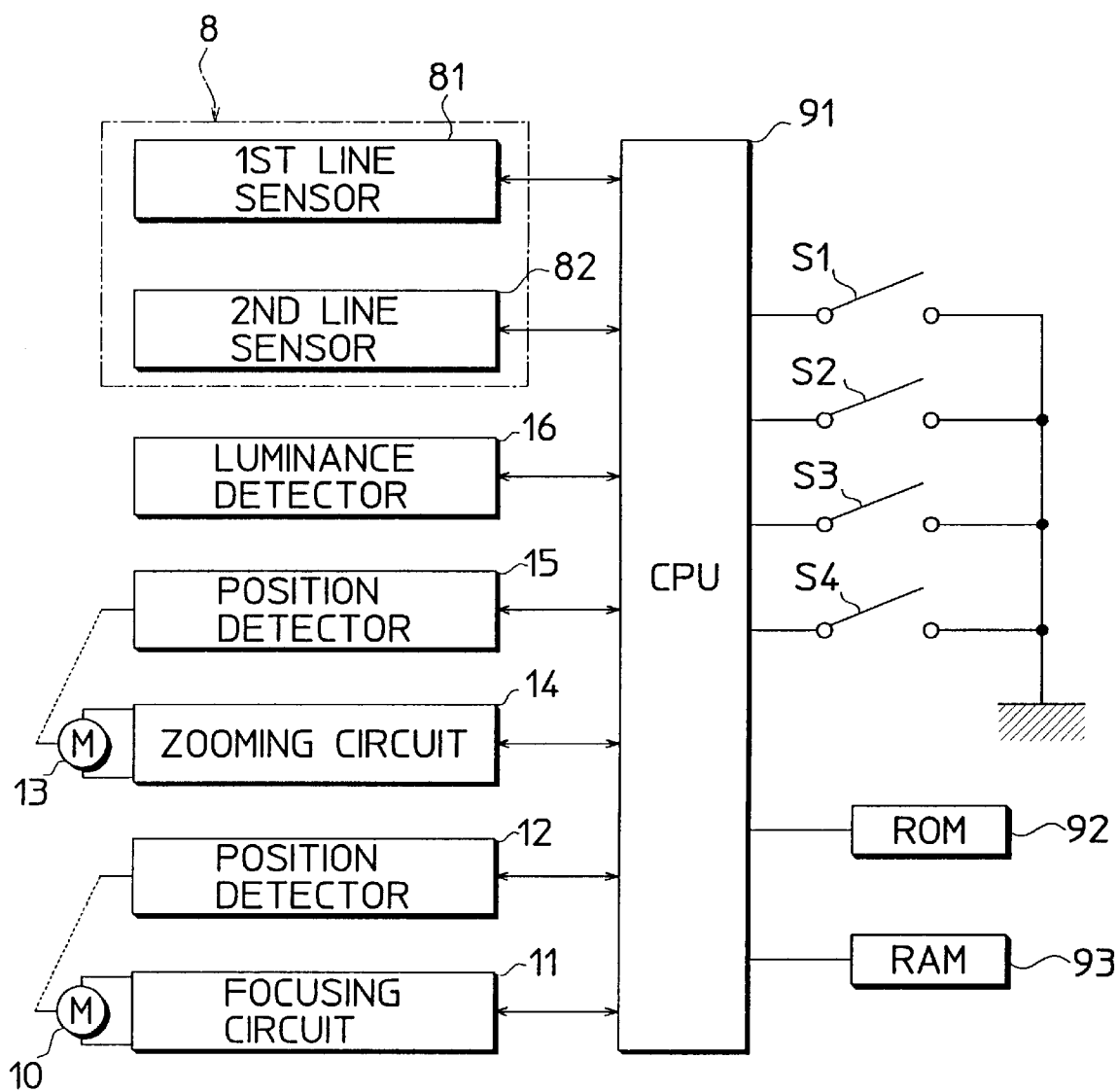
FIG. 2 is a block diagram showing a control system of the camera.

FIG. 2 is a block diagram showing a control system of the camera. The controller 9 includes a CPU (Central Processing Unit) 91, a ROM 92, a RAM 93, and controls an entire operation of the camera in addition to the distance calculation. The ROM 92 is adapted to store a program for the distance calculation, a program for all the operations of the camera, a table for defining a specified distance measurement range to be described later. The RAM 93 is adapted to temporarily store the data being calculated.

A switch S1 is a photography preparation switch for instructing the distance measurement and the exposure operation. A switch S2 is a release switch for instructing the photographing operation. It is preferable to use a button type switch as these switches S1 and S2. In other words, the photography preparation is instructed when this button is pressed halfway, and the exposure operation is carried out when it is fully pressed.

The focusing motor 10 is adapted to control the position of the focusing lens of the taking lens 2 in response to a drive signal from a focusing circuit 11. The position of the focusing lens is monitored by a position detector 12. The position detector 12 includes a bit mark member provided on a stationary cylinder of the taking lens 2 and a mark reader provided on the focusing lens. The bit mark member is provided with coded positional information. Based on obtained distance data, the focusing lens is moved to attain the in-focus condition of the taking lens 2 by monitoring the position of the focusing lens by the position detector 12.

A switch S3 is a zoom switch which is operated to change the focal length of the taking lens 2 toward a telephoto limit and toward wide-angle limit. Indicated at 14 is a zooming circuit which sends a drive signal to a zooming motor 13 only during an operation period of the switch S3 so that the zooming motor 13 drives in an operated direction of the switch S3 to change the focal length of the taking lens 2. The focusing motor 10 may also act as the zooming motor 13 by an appropriated transmission mechanism.

To automatically change the focal length of the taking lens 2, there is provided a position detector 15 similar to the position detector 12 of the automatic focussing system AF. The position detector 15 includes a bit mark member provided on the stationary cylinder of the taking lens 2 and a mark reader provided on a zooming lens of the taking lens 2. The position detector 15 outputs position data of the zooming lens corresponding to the focal length of the taking lens 2. The taking lens 2 has a macrophotography enable focal length which is outside the wide-angle limit. Accordingly, the position detector 15 can detect the position of the zooming lens of providing the macrophotography enable focal length.

A switch S4 is a photographing mode changeover switch for switching the photographing mode between the normal photographing mode and the macrophotographing mode.

Indicated at 16 is a luminance detector for detecting the luminance of an object when the photography preparation switch S1 is turned on. An aperture value and a shutter speed are set based on detection results.

Figure 3A:
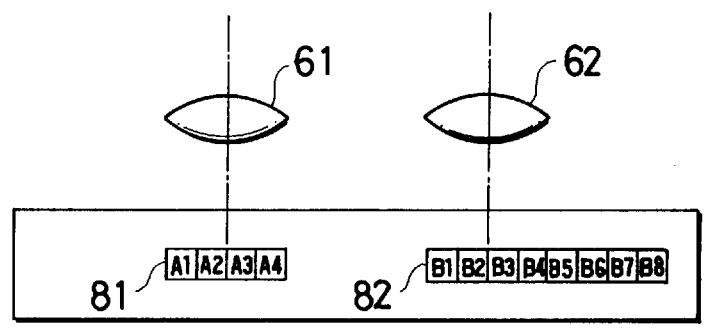
FIGS. 3A and 3B are diagrams showing line sensor arrangements for passive trigonometric distance measurement in the camera, FIG. 3A showing a one-side shift method, and FIG. 3B showing a both-side shift method.
Figure 3B:
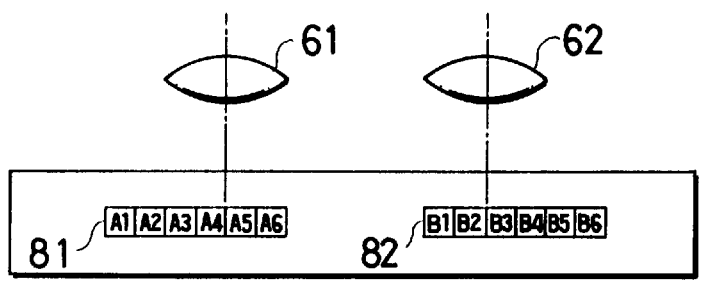
Figure 4A:
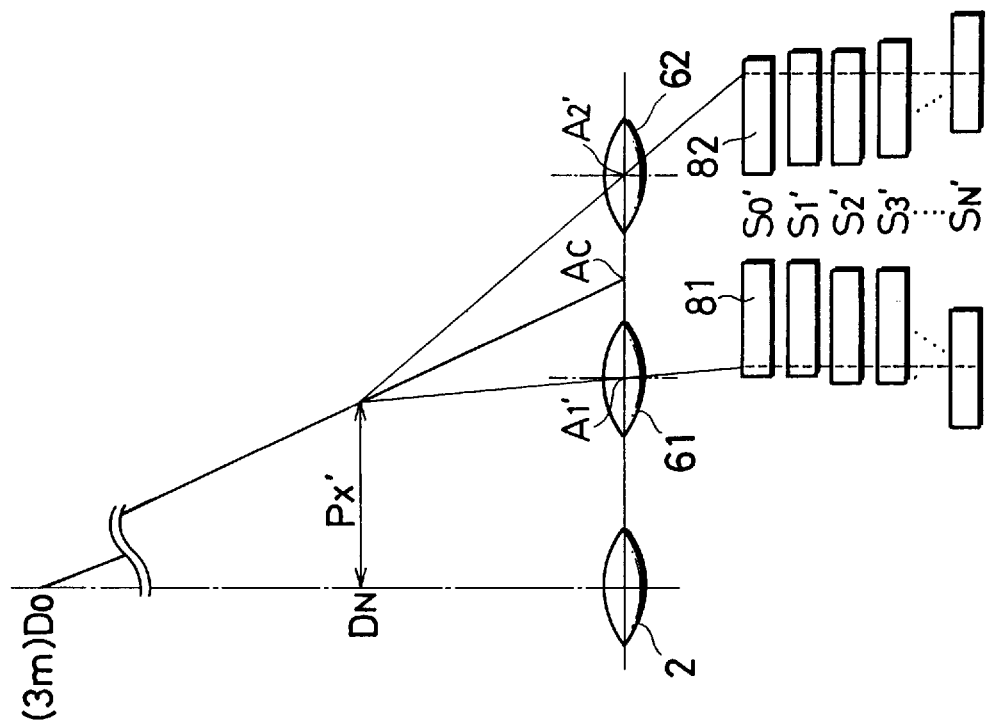
FIGS. 4A and 4B are diagrams showing relationships between line sensors and passive trigonometric distance measurement, FIG. 4A showing a one-side shift method and FIG. 4B showing a both-side shift method.
Figure 4B:
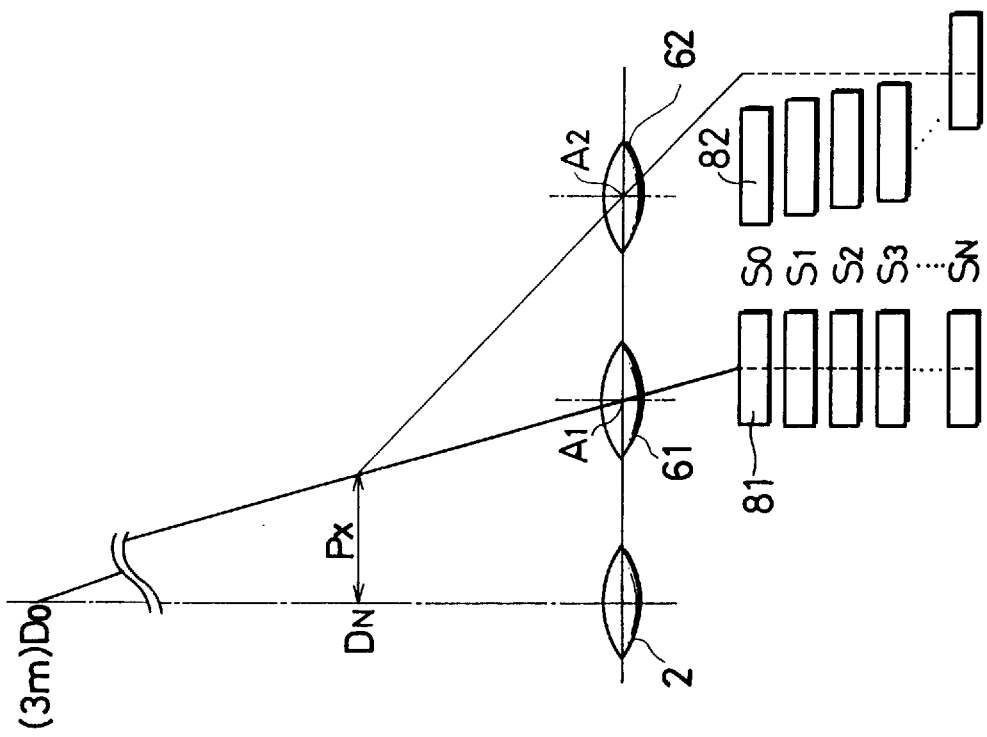

FIGS. 3A to 4B shows relationships between light beams and the line sensors 81, 82 in trigonometric calculation methods which is used in obtaining distance data in the camera. FIGS. 3A and 4A show a one-side shift method, while FIGS. 3B and 4B show a both-side shift method.

As shown in FIGS. 4A and 4B, the objective lens 61 and 62 of the automatic focusing system AF are arranged on the right side of the lens 2 of the viewfinder system F. The line sensor 81 closer to the taking lens 2 acts as a standard portion of the trigonometric distance calculation and the line sensor 82 acts as a reference portion of the trigonometric distance calculation. Also, the center of the distance measurement frame of the viewfinder system F coincides with that of the distance measurement area of the automatic focusing system AF when the object distance is at a specified distance Do, e.g., 3 meter.

In the case of adopting the one-side shift method, it is assumed for the sake of convenience that the line sensor 81 as the standard portion includes photoelectric conversion elements A1 to A4 and that the line sensor 82 as the reference portion includes photoelectric conversion elements B1 to B8. On the other hand, in the case of adopting the both-side shift method, it is assumed for the sake of convenience that the line sensor 81 as the standard portion includes photoelectric conversion elements A1 to A6 and that the line sensor 82 as the reference portion includes photoelectric conversion elements B1 to B6. See FIGS. 3A and 3B.

First, the one-side shift method will be described. In the line sensor 81, photoelectric conversion elements are fixedly selected of outputting pixel data used for the correlation calculation. On the other hand, in line sensor 81, photoelectric conversion elements are selected while sequentially shifting photoelectric conversion elements.

More specifically, for the pixel data from the elements A1 to A4, the pixel data from the elements B1 to B4 are selected and the correlation calculation is performed. This corresponds to a shift S0 in FIG. 4A. For the pixel data from the elements A1 to A4, the pixel data from the elements B2 to B5 are selected and the correlation calculation is performed. This corresponds to a shift S1 in FIG. 4A. For the pixel data from the elements A1 to A4, the pixel data from the elements B3 to B6 are selected and the correlation calculation is performed. This corresponds to a shift S2 in FIG. 4A. For the pixel data from the elements A1 to A4, the pixel data from the elements B4 to B7 are selected and the correlation calculation is performed. This corresponds to a shift S3 in FIG. 4A. Finally, for the pixel data from the elements A1 to A4, the pixel data from the elements B5 to B1 are selected and the correlation calculation is performed. This corresponds to a shift S4 in FIG. 4A.

There is such a known method for, based on the results of the correlation calculation, choosing data when the correlation value is highest as distance data under the condition that the correlation value is in excess of a predetermined threshold value. The predetermined threshold value is set to discriminate whether or not the measurement result is reliable. When the correlation value is not higher than this threshold value, it is assumed that the distance data was not obtained.

Next, the both-side shift method will be described. The photoelectric conversion elements of the line sensors 81 and 82 are sequentially shifted and selected. More specifically, the pixel data from the elements A3 to A6 and the pixel data from the elements B1 to B4 (corresponding to a shift S0' in FIG. 4B) are selected and the correlation calculation is performed. The pixel data from the elements A3 to A6 and the pixel data from the elements B2 to B5 (corresponding to a shift S1' in FIG. 4B) are selected and the correlation calculation is performed. The pixel data from the elements A2 to A5 and the pixel data from the elements B2 to B5 (corresponding to a shift S2' in FIG. 4B) are selected and the correlation calculation is performed. The pixel data from the elements A2 to A5 and the pixel data from the elements B3 to B6 (corresponding to a shift S3' in FIG. 4B) are selected and the correlation calculation is performed. Finally, the pixel data from the elements A1 to A4 and the pixel data from the elements B3 to B6 (corresponding to a shift S4' in FIG. 4B) are selected and the correlation calculation is performed. As a result of the correlation calculations, data having a highest correlation value is chosen as distance data.

In the case of adopting the one-side shift method, a line connecting the object and the center of the distance measurement area is a line segment DoA1 connecting the center of the distance measurement frame and a principle point A1 of the objective lens 61 at the photographing distance of Do. Accordingly, at the photographing distance Dn which is sufficiently closer to the camera than the point Do, a shift or parallax between the center of the distance measurement frame and that of the distance measurement area is Px.

On the other hand, in the case of adopting the both-side shift method, a line connecting the object and the center of the distance measurement area is a line segment DoAc connecting the center of the distance measurement frame and a middle point Ac between principle points A1' and A2' of the objective lenses 61 and 62 at the photographing distance of Do. Accordingly, the parallax at the distance Dn is Px'.

Since the parallax Px is smaller than the parallax Px' in a distance range shorter than Do, the one-side shift method gives more accurate distance data having a smaller parallax when the correlation calculation is repeated the same number of times for the one-side shift method and the both-side shift method.

FIGS. 5A to 8 show a distance measurement taking account for the parallax between the distance measurement frame and the distance measurement area according to the photographing distance.

Figure 5A:
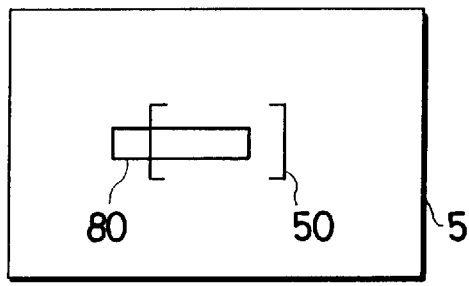
FIGS. 5A to 5D are diagrams showing a parallax of a distance measuring frame according to a photographing distance and a distance measuring area, FIG. 5A showing a case of an infinite photographing distance, FIG. 5B a case of a photographing distance of 3 meters, FIG. 5C a case of a photographing distance of 1 meter, and FIG. 5D a case of a photographing distance of 0.5 meter.
Figure 5B:
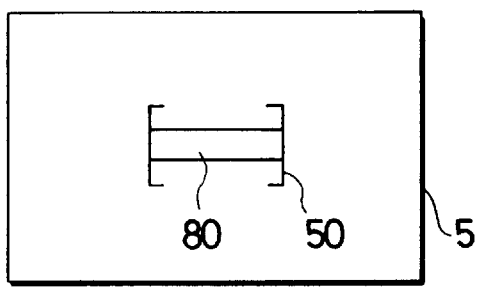
Figure 5C:
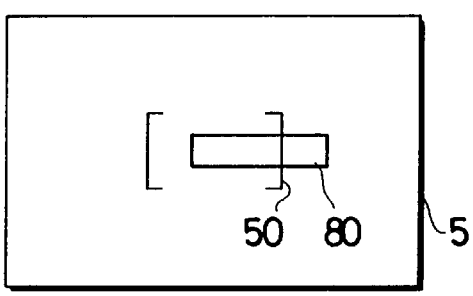
Figure 5D:
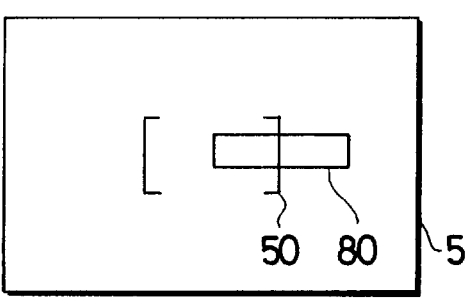

FIGS. 5A to 5D are diagrams showing the parallax between the distance measurement frame 50 and the distance measurement area 80 according to the photographing distance, FIG. 5A showing a case of an infinite photographing distance, FIG. 5B a case of a photographing distance of 3 meter, FIG. 5C a case of a photographing distance of 1 meter, and FIG. 5D a case of a photographing distance of 0.5 meter.

As shown in FIG. 1, the optical axis of the automatic focusing system AF is spaced apart from that of the viewfinder system F. In FIG. 1, the optical axis of the automatic focusing system AF is set at the right side of the optical axis of the viewfinder system F, the line sensor 81 is disposed closer to the optical axis of the viewfinder system F and the line sensor 82 is disposed at the right side of the line sensor 82.

In FIGS. 5A to 5B, there is now considered a case where an object stands 3 meters ahead of the camera main body 1 and beams of light from the object and its circumferences are introduced to the line sensor 81 through the objective lens 61. When a distance measurement area 80 defines a range within which the beams of light from the object are sensed by the line sensor 81, a design is made in advance such that the distance measurement area 80 and the distance measurement frame 50 coincide at the photographing distance of 3 meters.

More specifically, when the object is away from the camera main body 1 by 3 meters as shown in FIG. 5B, the distance measurement frame 50 indicating the position where the camera operator intends to perform a measurement to the object displayed on the viewfinder display 5 coincides with the distance measurement area 80 in which the camera actually performs the distance measurement.

As shown in FIG. 5A, the beams of light coming from the object away from the camera main body 1 by 3 meters or longer and passing through the objective lens 61 are incident upon the line sensor 81 substantially in parallel to the optical axis of the objective lens 61. Thus, the image of the distant object shifts to the left side, i.e., closer to the viewfinder system F.

On the other hand, as shown in FIG. 5C, the beams of light coming from the object 1 meter away from the camera main body 1 and passing through the objective lens 61 are incident upon the line sensor 81 at an angle to the optical axis of the objective lens 61. Thus, the image of this object shifts toward the right side, i.e. away from the viewfinder system F. As shown in FIG. 5D, the beams of light coming from the object 0.5 meter away from the camera main body 1 and passing through the objective lens 61 are incident upon the line sensor 81 at a greater angle to the optical axis of the objective lens 61. Thus, the image of this very close object shifts further toward the right side, with the result that substantially the half of it lies outside the distance measurement frame.

Figure 6:
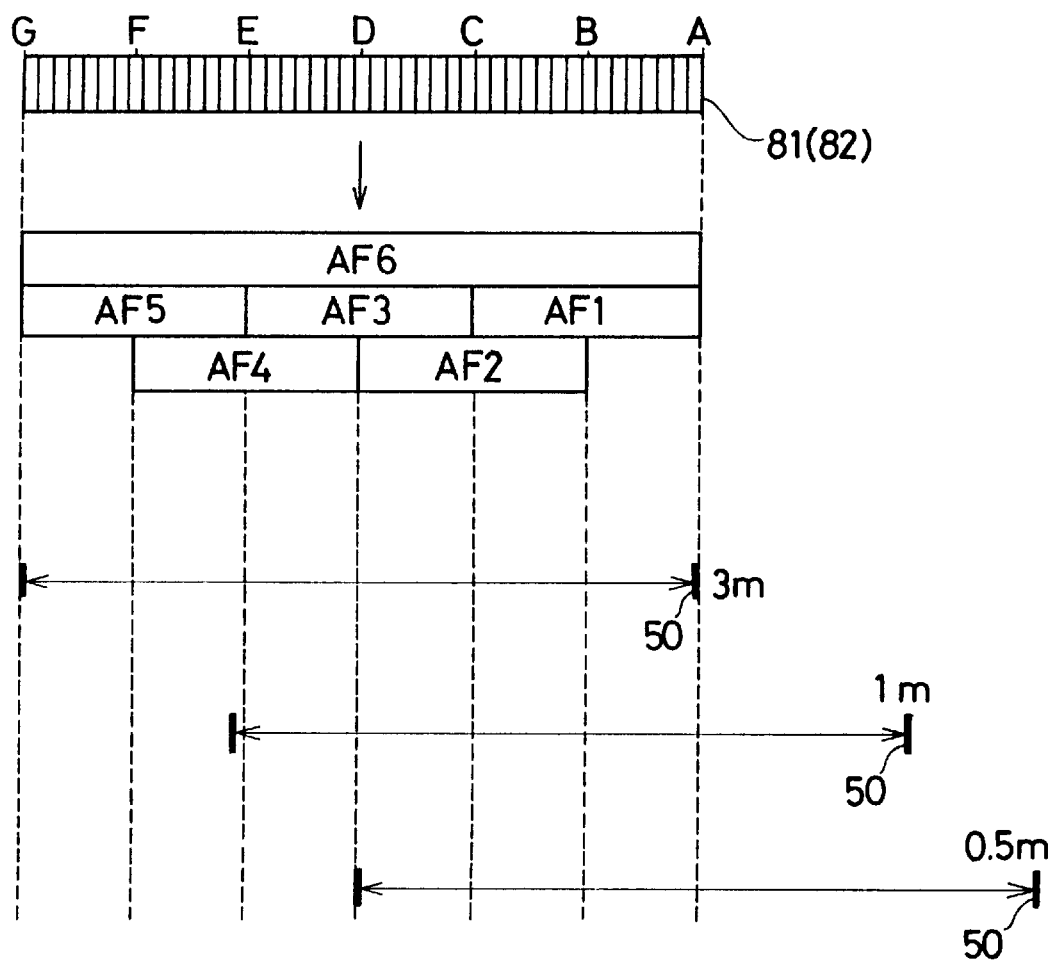
FIG. 6 is a chart showing a relationship between the construction of a line sensor and a distance measuring range.

FIG. 6 is a chart showing a relationship between the structure of the line sensor and the distance measurement ranges. The structure of the line sensors 81 and 82 adopted in this invention are applicable to both the one-side shift method and the both-side shift method. When the one-side shift method is used, the photoelectric conversion elements of the line sensor 82 are, for example, twice as many as those of the line sensor 81. When the both-side shift method is used, the number of the photoelectric conversion elements of the line sensors 81 and 82 are the same.

For the sake of convenience, description is given on the assumption that the line sensor of FIG. 6 is the line sensor 81. Indicated at A to G are points which divides the line sensor 81 in six equal sections with respect to its longitudinal direction, and at AF1 to AF6 distance measurement ranges used in obtaining distance data. The G-side is a side closer to the viewfinder system F. In the distance measurement range AF1, the photoelectric conversion elements in the sections defined by the points A and C are used. In the distance measurement range AF2, the photoelectric conversion elements in the sections defined by the points B and D are used. In the distance measurement range AF3, the photoelectric conversion elements in the sections defined by the points C and E are used. In the distance measurement range AF4, the photoelectric conversion elements in the sections defined by the points D and F are used. In the distance measurement range AF5, the photoelectric conversion elements in the sections defined by the points E and G are used. In the distance measurement range AF6, the photoelectric conversion elements in the sections defined by the points A and G, i.e., all the photoelectric conversion elements, are used. At the photographing distance of shorter than 0.5 meter, the distance measurement ranges AF4 and AF5 lie outside the distance measurement frame 50.

The controller 9 calculates the distance data for each of the distance measurement ranges AF1 to AF6. In FIG. 6, a photographing distance range of 1 meter to infinity is for the normal photographing mode and a photographing distance range of 0.5 meter to 1 meter is for the macrophotographing mode. These two photographing modes can be set using one taking lens 2. Based on the detection data from the position detector 15 or the state of the mode switch S4, the controller 9 judges which photographing mode is set. When the macrophotographing mode is set, the controller 9 sets the distance measurement ranges AF1 to AF3 as those to lie within the distance measurement frame, while setting the distance measurement ranges AF4 to AF6 as those to lie outside the distance measurement frame. The correspondence between the distance measurement ranges and whether they lie within or outside the distance measurement frame is stored in the ROM 92. Depending upon the type of the taking lens, not the position detector 15, but the position detector 12 may be used to discriminate whether or not the macrophotographing mode is set.

Figure 7:
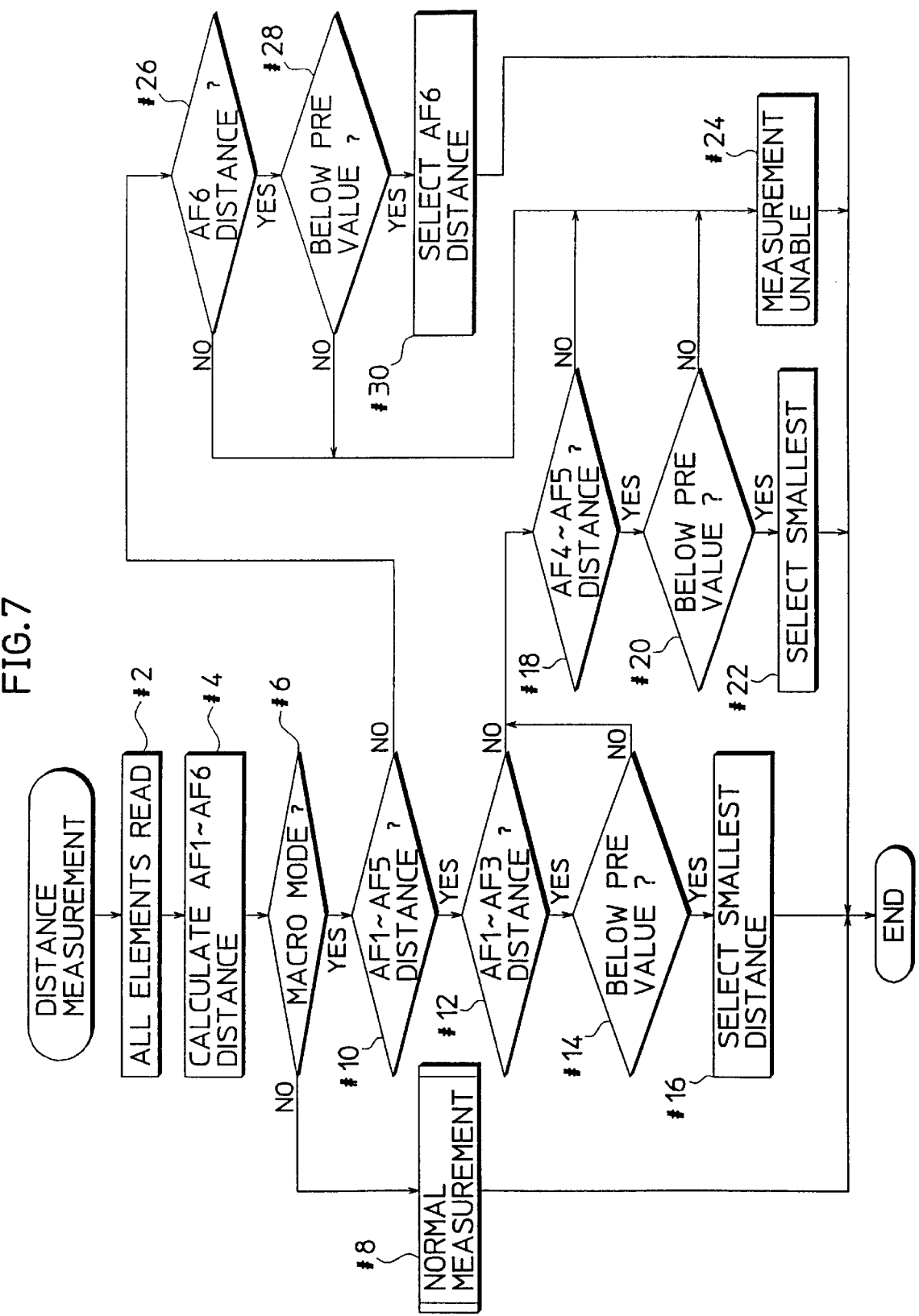
FIG. 7 is a flowchart showing a distance data calculating routine of the camera.

The distance data calculation will be described with reference to a flowchart shown in FIG. 7.

When the switch S1 is turned on, the distance measurement is started and thereby beams of light representing the object image which have passed through the objective lenses 61 and 62 are received by all the photoelectric conversion elements of the line sensors 81 and 82, and are converted into digital values which are read by the controller 9 (Step #2).

The line sensors 81 and 82 perform the correlation to the respective distance measurement ranges AF1 to AF6 based on the read pixel data from all the photoelectric conversion elements, thereby calculating the respective distance data (Step #4). It is then discriminated whether the macrophotographing mode is set (Step #6). Unless the macrophotographing mode is set, i.e., the normal photographing mode is set, a subroutine "Normal Measurement" is carried out (Step #8), thereby completing this routine. If the macrophotographing mode is set, it is discriminated whether the distance data were obtained in the distance measurement ranges AF1 to AF5 (Step #10). If the distance data were obtained in the distance measurement ranges AF1 to AF5, it is further discriminated whether the distance data were obtained within the distance measurement frame, i.e., in the distance measurement ranges AF1 to AF3 (Step #12). If the distance data were obtained in the distance measurement ranges AF1 to AF3, it is discriminated whether this distance data are not greater than a predetermined value, e.g., 1 meter (Step #14). If the distance data are not greater than the predetermined value, a smallest value is selected as distance data (Step #16), thereby completing this routine.

If the discrimination results in Steps #12 and #14 are in the negative, it is discriminated whether the distance data were obtained outside the distance measurement frame, i.e., in the distance measurement ranges AF4 and AF5 (Step #18). If the distance data were obtained in the distance measurement ranges AF4 and AF5, it is discriminated whether this distance data are not greater than a predetermined value, e.g., 1 meter (Step #20). If the distance data are not greater than the predetermined value, a smallest value is selected as distance data (Step #22), thereby completing this routine. If the discrimination results in Steps #18 and #20 are in the negative, a specified value, e.g., 0.6 meter is set as being unable to measure the distance (Step #24), thereby completing this routine.

If the distance data was obtained in none of the distance measurement ranges AF1 to AF5 (NO in Step #10), it is discriminated whether the distance data was obtained in the distance measurement range AF6 (Step #26). If no distance data was obtained in the distance measurement range AF6, this routine returns to Step #24 in which the specified value, e.g., 0.6 meter, is set. On the other hand, if the distance data was obtained in the distance measurement range AF6, it is discriminated whether this distance data are not greater than the predetermined value, e.g., 1 meter (Step #28). If the distance data are not greater than the predetermined value, it is selected as distance data (Step #30), thereby completing this routine.

Figure 8:
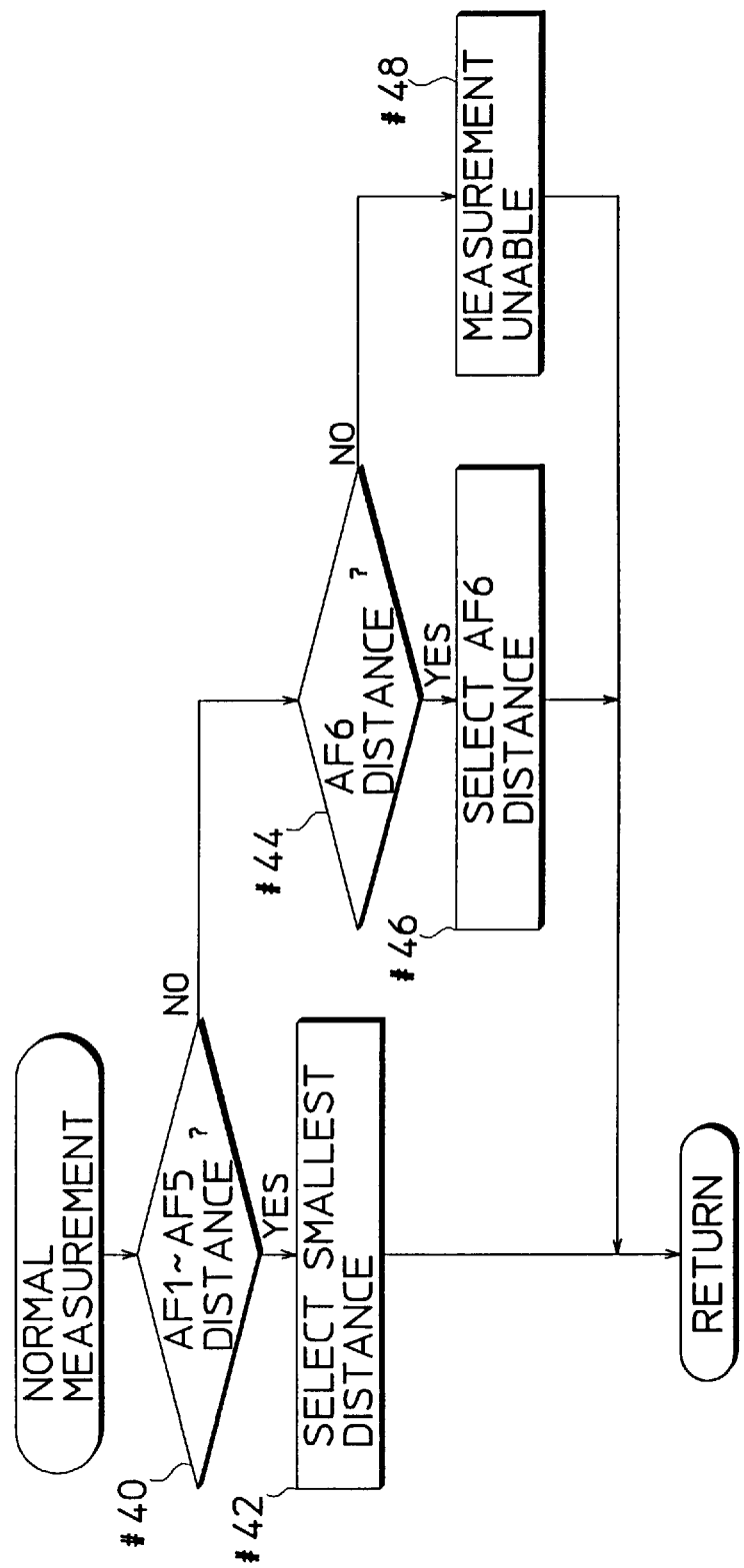
FIG. 8 is a flowchart showing a subroutine "Normal Processing" of the distance data calculating routine.
Figure 9:
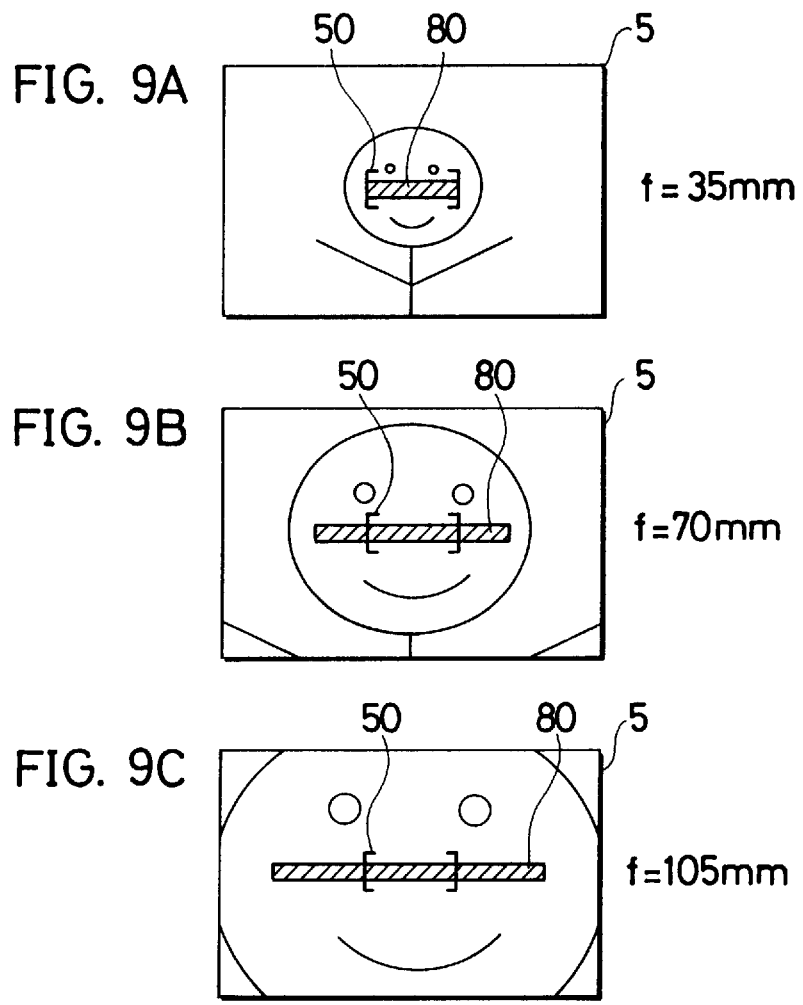
FIGS. 9A to 9C are diagrams showing a relationship between the distance measuring frame and the distance measuring area at specified focal lengths, FIG. 9A showing a case where a focal length f=35 mm, FIG. 9B a case where the focal length f=70 mm, and FIG. 9C a case where the focal length f=105 mm.

FIG. 8 is a flowchart showing the subroutine "Normal Measurement". In this subroutine, it is first discriminated whether the distance data were obtained in the distance measurement ranges AF1 to AF5 (Step #40). If the distance data were obtained in the distance measurement ranges AF1 to AF5, this subroutine returns after selecting a smallest value as distance data (Step #42). On the other hand, if the distance data was obtained in none of the distance measurement ranges AF1 to AF5, it is discriminated whether the distance data was obtained in the distance measurement range AF6 (Step #44). If the distance data was obtained in this range AF6, it is selected as distance data (Step #46). Conversely, if no data was obtained in the range AF6, the specified value, e.g., 0.6 meter is set as being unable to measure the distance (Step #48) and this subroutine returns.

In this way, the distance data is obtained in the distance measurement ranges within the distance measurement frame based on the detected focusing condition, and the taking lens 2 is driven to attain the in-focus condition based on the obtained distance data. If the distance data is invalid, the distance data obtained in the distance measurement ranges outside the distance measurement frame is used, thereby reducing the possibility of an incidence where the distance measurement is impossible.

FIGS. 9A to 11 show the distance measurement taking account for the shrinkage of the distance measurement area 80 relative to the distance measurement frame 50 as the focal length of the taking lens 2 increases.

FIGS. 9A to 9C are diagrams showing the relationship between the distance measurement frame 50 and the distance measurement area 80 which varies with the focal length, FIG. 9A showing a case where the focal length f=35 mm, FIG. 9B a case where the focal length f=70 mm, and FIG. 9C a case where the focal length f=105 mm.

The size of the distance measurement area 80 relative to the distance measurement frame 50 changes for the following reason. The magnification of the viewfinder system F (viewfinder magnification) varies with the focal length f of the taking lens 2, i.e., with the image magnification, whereas the magnification of the automatic focusing system AF is fixed. In this case, the distance measurement area 80 is fixed regardless of the viewfinder magnification, and therefore the distance measurement is performed with respect to a specific position of the object. On the other hand, since the object image displayed on the viewfinder display 5 changes according to the viewfinder magnification, the range of the object image lying within the distance measurement frame 50 differs depending upon the viewfinder magnification.

In FIG. 9A, the size of the distance measurement frame 50 coincides with that of the distance measurement area 80. Since an actual distance data is obtained within the distance measurement frame 50 in this state, the distance measurement position is as intended by the camera operator. However, as shown in FIGS. 9B and 9C, the object image (the distance measurement area 80 as well) displayed on the viewfinder display 5 is more enlarged as the viewfinder magnification becomes larger. Thus, only a part of the object image lies within the distance measurement frame 50, with the result that there is a discrepancy between the distance measurement frame 50 and the distance measurement area 80 in which the distance measurement is actually performed.

Figure 10:
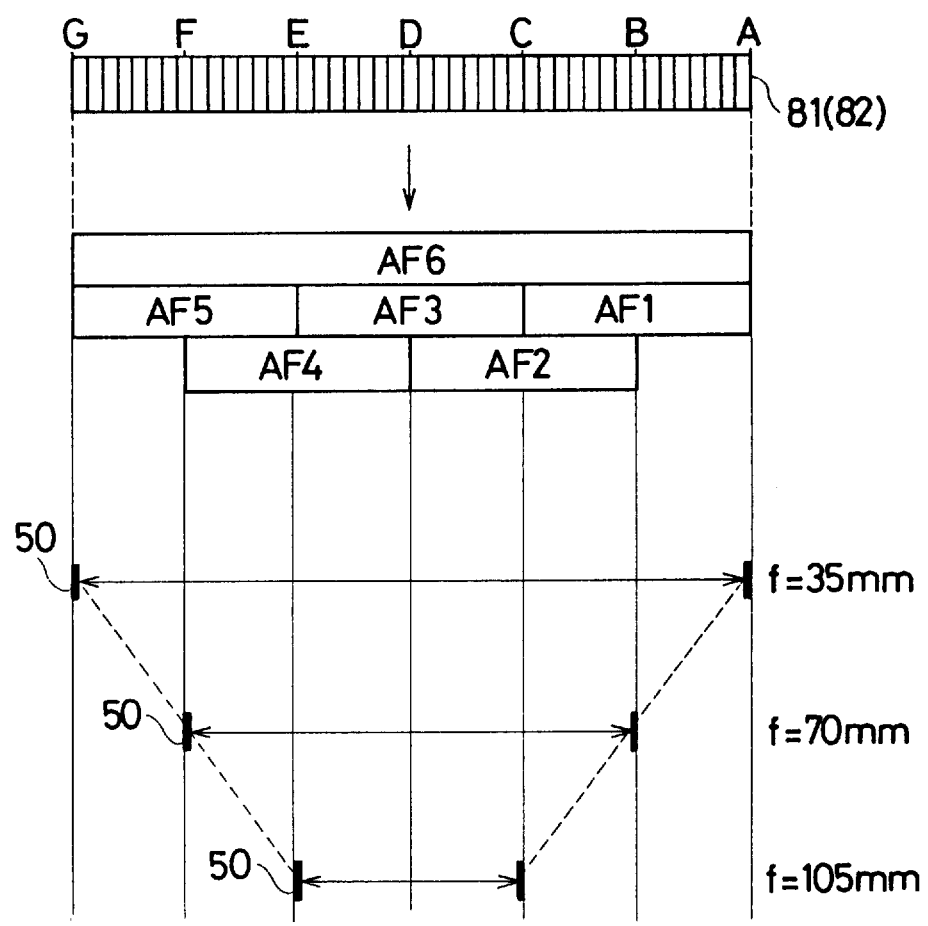
FIG. 10 is a chart showing a relationship between the construction of the line sensor and the distance measuring range.

FIG. 10 is a diagram showing the relationship between the construction of the line sensor and the distance measurement ranges. The construction of the line sensors 81 and 82 is applicable to both the one-side shift method and the both-side shift method. When the one-side shift method is adopted, the line sensor 81 has, for example, twice as many photoelectric conversion elements as the line sensor 82. When the both-side shift method is adopted, the line sensor 81 has as many photoelectric conversion elements as the line sensor 82.

For the sake of convenience, description is given on the assumption that the line sensor shown in FIG. 10 is the line sensor 81. Indicated at A to G are points for dividing the line sensor 81 into six equal sections in its longitudinal direction, and at AF1 to AF6 distance measurement ranges used to obtain the distance data. The G-side is a side closer to the viewfinder system F. In the distance measurement range AF1, the photoelectric conversion elements in the sections defined by the points A and C are used. In the distance measurement range AF2, the photoelectric conversion elements in the sections defined by the points B and D are used. In the distance measurement range AF3, the photoelectric conversion elements in the sections defined by the points C and E are used. In the distance measurement range AF4, the photoelectric conversion elements in the sections defined by the points D and F are used. In the distance measurement range AF5, the photoelectric conversion elements in the sections defined by the points E and G are used. In the distance measurement range AF6, the photoelectric conversion elements in the sections defined by the points A and G, i.e., all the photoelectric conversion elements, are used. As is clear from FIG. 10, the distance measurement ranges AF1 and AF5 lie outside the distance measurement frame 50 when the focal length of the taking lens 2 is 105 mm.

The controller 9 calculates the distance data for the respective distance measurement ranges AF1 to AF6. In FIG. 10, the focal length of the taking lens 2 is variable at least in the range of 35 mm to 105 mm. The controller 9 discriminates in which focal length range the current focal length lies based on the detection data from the position detector 15 using a table prestored in the ROM 92, e.g., TABLE-1, and determines whether the distance measurement range corresponding to the discriminated focal length range lies within or outside the distance measurement frame.

TABLE 1

| FOCAL LENGTH | 35 TO 55 mm | 56 TO 85 mm | 86 TO 105 mm |
|---|---|---|---|
| INSIDE FRAME | AF1 TO 5 | AF2, 3, 4 | AF3 |
| OUTSIDE FRAME | — | AF1, 5 | AF1, 2, 4, 5 |

Since the distance measurement frame coincides with the distance measurement area in the focal length range of 35 mm to 55 mm as shown in FIG. 10, all the distance measurement ranges AF1 to AF5 are set to lie within the distance measurement frame. Since the distance measurement ranges AF1 and AF5 partially lie outside the distance measurement frame 50 in the focal length range of 56 mm to 85 mm as shown in FIG. 10, the distance measurement ranges AF2 to AF4 are set to lie within the distance measurement frame 50 and the distance measurement ranges AF1 and AF5 are set to lie outside the distance measurement frame 50. Since the distance measurement ranges AF1, AF2, AF4 and AF5 partially lie outside the distance measurement frame 50 in the focal length range of 86 mm to 105 mm as shown in FIG. 10, the distance measurement range AF3 is set to lie within the distance measurement frame 50 and the distance measurement ranges AF1, AF2, AF4 and AF5 are set to lie outside the distance measurement frame 50.

Figure 11:
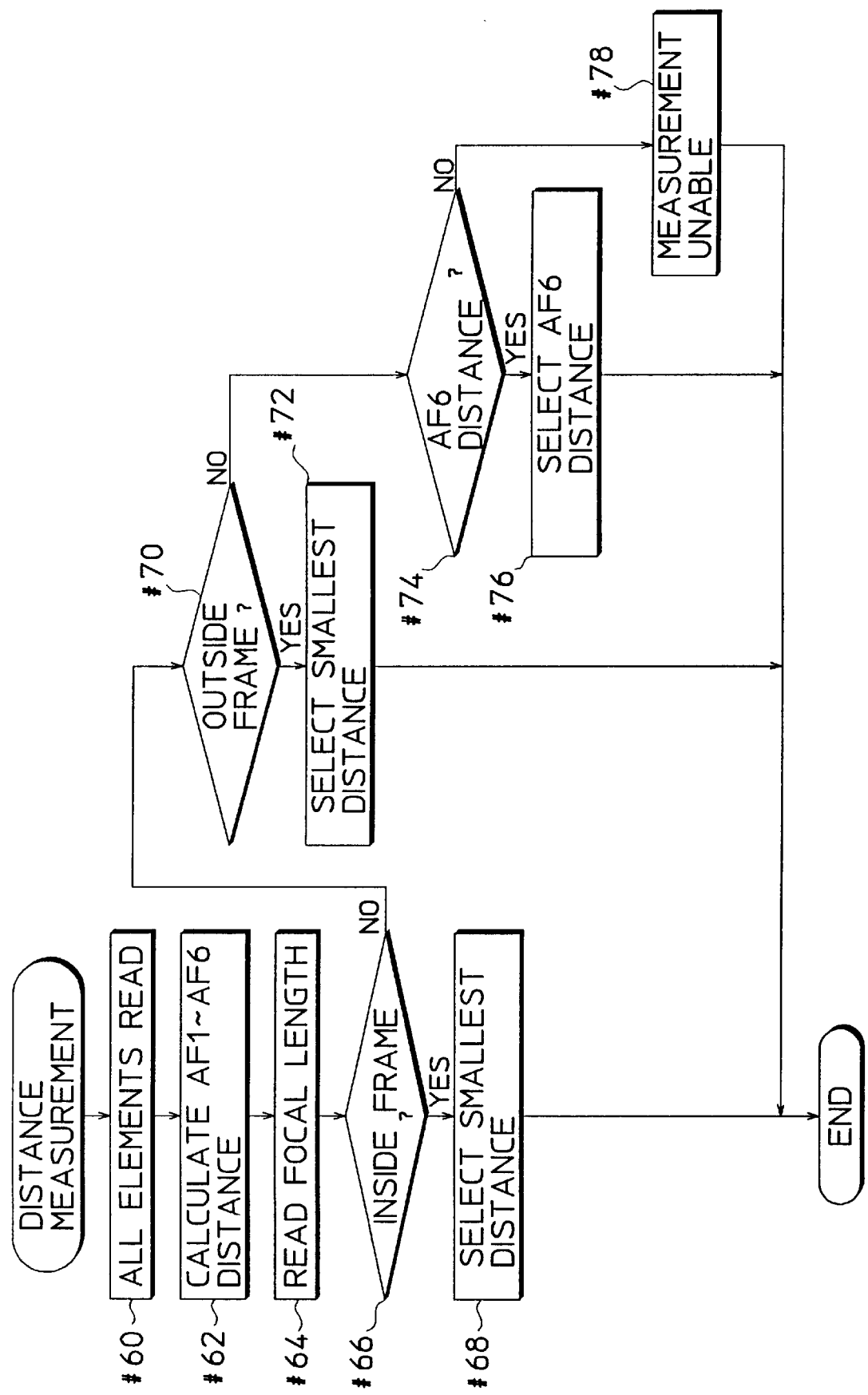
FIG. 11 is a flowchart showing another distance calculating routine of the camera.

The distance data calculation will be described with reference to a flowchart shown in FIG. 11.

When the switch S1 is turned on, the distance measurement is started and thereby beams of light representing the object image having passed through the objective lenses 61 and 62 are received by all the photoelectric conversion elements of the line sensors 81 and 82, and are converted into digital values which are read by the controller 9 (Step #60).

The correlation calculation is performed between the line sensors 81 and 82 for the respective distance measurement ranges AF1 to AF6 based on the read pixel data from all the photoelectric conversion elements, and the respective distance data are calculated (Step #62). The focal length of the taking lens 2 is read by the position detector 15 (Step #64), and it is discriminated whether the distance data were obtained in the distance measurement range corresponding to the focal length as defined in TABLE-1, i.e., within the distance measurement frame (Step #66). If the distance data were obtained, a smallest value thereof is selected as distance data (Step #68) and this routine ends.

On the other hand, if no distance data was obtained within the distance measurement frame, it is discriminated whether the distance data were obtained outside the distance measurement frame, i.e., in the other distance measurement ranges (Step #70). If the distance data were obtained, a smallest value thereof is selected as distance data (Step #72) and this routine ends.

Further, if no distance data was obtained outside the distance measurement frame, it is discriminated whether the distance data was obtained in the distance measurement range AF6 (Step #74). If the distance data was obtained in this range AF6, this value is selected as distance data (Step #76). If no distance data was obtained in this range AF6, a specified value, e.g., 10 meters, is set as being unable to perform the distance measurement (Step #78) and this routine ends.

In this way, the distance data is obtained in the distance measurement ranges within the distance measurement frame corresponding to the detected focal length, and the taking lens 2 is driven to attain the in-focus condition based on the obtained distance data. If no valid distance data is obtained, the distance data obtained in the distance measurement ranges outside the distance measurement frame is selected, thereby reducing the possibility of an incidence where the distance measurement is impossible.

As described above, according to the invention, the distance data is obtained using the pixel data obtained in a range corresponding to the focal length and the validity of the obtained distance data is determined. If the obtained distance data is valid, it is used. Unless otherwise, the taking lens is driven to attain an in-focus condition using the distance data obtained from the pixel data outside the above range. Accordingly, even with a camera in which an optical axis of an automatic focusing system including a pair of line sensors differs from that of a viewfinder system, the possibility of an incidence where the distance measurement is impossible can be more reduced than the cameras adopting the prior art methods, regardless of the viewfinder magnification.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:

a taking lens for photographing an object, the focal length of the taking lens being variable;

a viewfinder system whose magnification is changeable in accordance with a varied focal length of the taking lens, the viewfinder system having an optical axis;

a sensor having a number of sensing elements which are arrayed in a line and each receive light to generate an electrical signal in accordance with an intensity of the received light, the sensing elements being defined with a plurality of particular sensing areas corresponding to a plurality of varied focal lengths of the taking lens;

a selector which selects the particular sensing area which corresponds to the focal length of the taking lens;

a distance measuring optical system which introduces light from the object to the sensing elements of the sensor, and having an optical axis different from the optical axis of the viewfinder system;

a first distance data generator which is operable to generate distance data based on electrical signals generated in the sensing elements within the selected sensing area;

a second distance data generator which is operable to generate distance data based on electrical signals generated in the sensing elements within a sensing area other than the selected sensing area;

a discriminator which discriminates whether or not the first distance data generator is operable to generate distance data based on the electrical signals from the sensing elements within the selected sensing area; and a controller which allows the first distance data generator to generate distance data while suspending the second distance data generator when the first distance data generator is discriminated to be operable, and allows the second distance data generator to generate distance data when the first distance data generator is discriminated to be inoperable.

2. A camera according to claim 1, further comprising:
a focusing device which places the taking lens in an in-focus state based on the generated distance data.

3. A camera according to claim 1, wherein:
the viewfinder system includes a viewfinder screen provided with a distance measurement frame; and
the particular sensing area defined on the sensor corresponds to the distance measurement frame.

4. A camera comprising:
a taking lens for photographing an object, the taking lens being selectively settable either in a first photographing mode of photographing an object which is away from the camera in a first distance or in a second photographing mode of photographing an object which is away from the camera in a second distance smaller than the first distance;
a viewfinder system having an optical axis;
a sensor having a number of sensing elements which are arrayed in a line and each receive light to generate an electrical signal in accordance with an intensity of the received light, the sensing elements being defined with particular sensing areas corresponding to the first and second photographing modes of the taking lens, respectively;
a distance measuring optical system which introduces light from the object to the sensing elements of the sensor, and having an optical axis different from the optical axis of the viewfinder system;
a first distance data generator which is operable to generate a first distance data based on electrical signals generated in the sensing elements within a particular sensing area corresponding to a selected photographing mode;
a second distance data generator which is operable to generate a second distance data based on electrical signals generated in the sensing elements within a sensing area other than the particular sensing area;
a discriminator which discriminates whether or not the first distance data generator is operable; and
a controller which allows the first distance data generator to generate distance data while suspending the second distance data generator when the first distance data generator is discriminated to be operable, and allows the second distance data generator to generate distance data when the first distance data generator is discriminated to be inoperable.

5. A camera according to claim 4, further comprising:
a focusing device which places the taking lens in an in-focus state based on the generated distance data.

6. A camera according to claim 4, wherein:
the viewfinder system includes a viewfinder screen provided with a distance measurement frame; and
the particular sensing area defined on the sensor corresponds to the distance measurement frame.

7. A camera comprising:
a taking lens for photographing an object;
a viewfinder system including a viewfinder screen provided with a distance measurement frame;
a sensor having a number of sensing elements which are arrayed in a line and each receive light to generate an electrical signal in accordance with an intensity of the received light, the sensing elements being defined with a particular sensing area corresponding to the distance measurement frame provided on the viewfinder screen;
a distance measuring optical system which introduces light from the object to the sensing elements of the sensor, and having an optical axis different from the optical axis of the viewfinder system;
a first distance calculator which is operable to calculate a first distance based on electrical signals generated in the sensing elements within the particular sensing area;
a second distance calculator which is operable to calculate a second distance based on electrical signals generated in the sensing elements within a sensing area other than the particular sensing area;
a discriminator which discriminates whether or not the first distance calculator is operable; and
a controller which allows the first distance calculator to calculate a distance while suspending the second distance calculator when the first distance calculator is discriminated to be operable, and allows the second distance calculator to calculate a distance when the first distance calculator is discriminated to be inoperable.

8. A camera according to claim 7, further comprising:
a focusing device which places the taking lens in an in-focus state based on the calculated distance.

9. A camera comprising:
a taking lens for photographing an object, the focal length of the taking lens being variable;
a viewfinder system whose magnification is changeable in accordance with a varied focal length of the taking lens, the viewfinder system having an optical axis and a viewfinder screen provided with a distance measurement frame;
a sensor having a number of sensing elements which are arrayed in a line and each receive light to generate an electrical signal in accordance with an intensity of the received light;
a distance measuring optical system which introduces light from the object to the sensing elements of the sensor, and having an optical axis different from the optical axis of the viewfinder system;
a designator which designates a particular sensing area, corresponding to the current focal length of the taking lens, over the sensing elements of the sensor;
a first distance data generator which is operable to generate a first distance data based on electrical signals generated in the sensing elements within the particular sensing area designated by the designator;
a second distance data generator which is operable to generate a second distance data based on electrical signals generated in the sensing elements within a sensing area other than the particular sensing area;
a discriminator which discriminates whether or not the first distance data generator is operable;
a selector which selects the first distance data generator when the first distance data generator is discriminated to be operable, and the second distance data generator when the first distance data generator is discriminated to be inoperable; and
a focusing device which places the taking lens in an in-focus state based on the generated distance data.

10. A camera comprising:

a taking lens for photographing an object, the focal length of the taking lens being variable;

a viewfinder system whose magnification is changeable in accordance with a varied focal length of the taking lens, the viewfinder system having an optical axis;

a sensor having a number of sensing elements which are arrayed in a line and each receive light to generate an electrical signal in accordance with an intensity of the received light, the sensing elements being defined with a plurality of particular sensing areas corresponding to a plurality of varied focal lengths of the taking lens;

a distance measuring optical system which introduces light from the object to the sensing elements of the sensor, and having an optical axis different from the optical axis of the viewfinder system;

a selector which selects the particular sensing area which corresponds to the focal length of the taking lens;

a first distance data generator which is operable to generate distance data based on electrical signals generated in the sensing elements within the selected sensing area;

a second distance data generator which is operable to generate distance data based on electrical signals generated in the sensing elements within a sensing area other than the selected sensing area;

a discriminator which discriminates whether or not the first distance data generator is operable to generate distance data based on the electrical signals from the sensing elements within the selected sensing area; and a controller which selects the distance data generated by the first distance data generator when the first distance data generator is discriminated to be operable, and selects the distance data generated by the second distance data generator when the first distance data generator is discriminated to be inoperable.

11. A camera according to claim 10, further comprising:

a focusing device which places the taking lens in an in-focus state based on the selected distance data.

12. A camera according to claim 10, wherein:

the viewfinder system includes a viewfinder screen provided with a distance measurement frame; and the particular sensing area defined on the sensor corresponds to the distance measurement frame.

* * * * *